(No Model.)

J. LEIGH & R. W. H. McDOWELL.
ELASTIC TIRE FOR WHEELS.

No. 310,862. Patented Jan. 13, 1885.

Witnesses:
G. B. Maynadier
John R. Snow.

Inventors:
James Leigh
Robert Wm. Henry McDowell
by their attorney,
J. E. Maynadier

UNITED STATES PATENT OFFICE.

JAMES LEIGH, OF CHELSEA, MASSACHUSETTS, AND ROBERT WILLIAM HENRY McDOWELL, OF MANCHESTER, COUNTY OF LANCASTER, ENGLAND, ASSIGNORS, BY MESNE ASSIGNMENTS, TO THE REVERE RUBBER COMPANY, OF BOSTON, MASSACHUSETTS.

ELASTIC TIRE FOR WHEELS.

SPECIFICATION forming part of Letters Patent No. 310,862, dated January 13, 1885.

Application filed August 23, 1882. (No model.) Patented in England December 19, 1876, No. 4,898.

*To all whom it may concern:*

Be it known that we, JAMES LEIGH, of Chelsea, in the county of Suffolk and State of Massachusetts, and ROBERT WILLIAM HENRY McDOWELL, of Manchester, in the county of Lancaster, England, have invented a new and useful Elastic Tire, (for which we have obtained a patent in Great Britain, No. 4,898, bearing date December 19, 1876,) of which the following is a specification.

Figure 1:
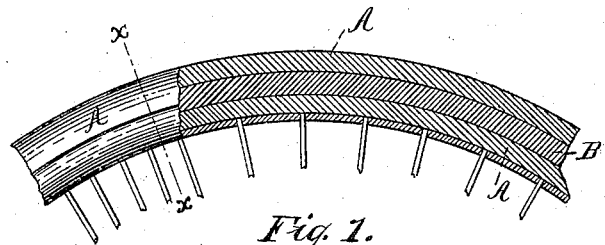
Figure 2:
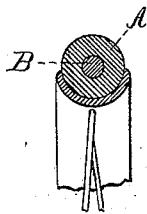
Figure 3:
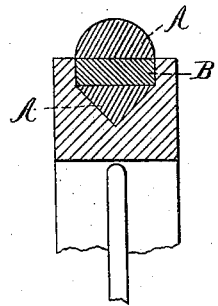

In the drawings, Figure 1 is a side elevation, partly in section, of a portion of a wheel with our tire. Fig. 2 is a cross-section on line *x x*, Fig. 1. Fig. 3 illustrates by cross-section another form of our tire.

Elastic tires are used largely for velocipedes and bicycles, and their use has been suggested for other light vehicles; but the difficulty of securing them in place has been so serious that their use has been much more limited than it would otherwise have been. The usual way of securing them in place is to make the tire of soft vulcanized rubber, and in circumference considerably less than the wheel to which it is to be applied, and to stretch the tire, so that it could be readily placed in the groove around the fellies of the wheel, its resiliency being mainly relied upon to keep it in place, although cement is used as an additional precaution. This would answer well but for the fact that rubber under strain is in the best possible condition to be cut, and the strain required to make the tire hold firmly enough in the groove is far more than is admissible, for the reason that a rubber tire strained to that extent would be ruined by sharp stones in the roadway; consequently only a moderate strain can be used practically.

We are aware of the provisional specification of English Patent No. 2,836, dated August 17, 1874, to Frederick Bird, in which two thicknesses of rubber of different kinds were suggested. The inner layer of hard rubber was designed to be secured to the metal rim of the wheel by screw-bolts fixed in this inner layer, the heads of these bolts being covered by the outer thickness of ordinary soft rubber united or vulcanized to the inner hard rubber. The hard rubber in this tire was to serve the purpose of holding the screw-bolts securely, and was not at all like the hard rubber in our tire in function or mode of operation, and the tire itself, by reason of the screw-bolts projecting from its inner surface, could not be made in the form of a ring before it was applied to the wheel, while it is impossible to apply our tire until after it is made into a ring whose diameter is considerably less than that of the wheel to which it is to be applied.

Our tire is wholly unlike that suggested by Bird, in that it is a continuous ring, and has no screw-bolts projecting from it, while Bird's suggestion is of a strip not joined at its ends, and capable of being secured only by the screw-bolts embedded in it. Moreover, when in place, our tire is held in its groove by the non-elastic quality of the elongated hard-rubber core, instead of by screws and nuts, as suggested by Bird.

Our invention is based upon the well-known fact that rubber may be so compounded and vulcanized that a cord or band may be produced which will not stretch appreciably at ordinary temperatures, and yet will stretch readily, like the ordinary soft vulcanized rubber, when heated to, say, 200° Fahrenheit; and our tire is made up of the usual compound for making soft rubber, with a core or layer of a compound adapted to make, when vulcanized, a semi-hard rubber having the property above described.

The details of manufacture will be well known to all skilled in the art without further description.

In practice we make our tires of a circumference much nearer equal to that of the wheel than any made before our invention, the best practical rule being to make the tire of a circumference found by deducting from the circumference of the wheel one inch for every foot of the diameter of the wheel. Thus for a wheel forty-eight inches in circumference the tire is best made forty-six inches and two-thirds, forty-eight inches, less one and one-third inch, the diameter being sixteen inches, or one and one-third foot.

The construction of our tire will be readily understood by reference to the drawings, in which—

Figs. 1 and 2 show a portion of a cylindrical tire with the core B of semi-hard rubber completely covered by the soft vulcanized rubber A. In Fig. 3 the core B is shown as covered on its top and bottom sides only by the soft rubber A.

Other forms of tire embodying our invention may be made to suit different-shaped fellies.

Our tire is best applied by putting it into hot water and letting it remain long enough to get heated, so that it will stretch sufficiently to allow it to be put in place in its groove, when the resiliency of the tire as a whole—for both portions A and B are resilient when thus treated—will hold it in place just as if it were an ordinary rubber tire; but when cold the semi-hard portion B will be under strain, and will not stretch appreciably, and consequently will bind the tire very firmly to the wheel.

We are aware that a metallic core for rubber tires is shown and described in Patent No. 169,100, October 26, 1875, to J. A. Greene. Obviously in such a tire the rubber would be destroyed by the heat requisite to expand the metallic core sufficiently to allow the tire to be shrunk into a groove in the periphery of the wheel.

We do not claim, broadly, a rubber tire having an unyielding core.

We claim as our invention—

The combination, with a rubber tire, of a semi-hard rubber core unyielding at ordinary temperatures, and extensible at a temperature non-injurious to the rubber, as hereinbefore set forth.

JAMES LEIGH.
ROBERT WILLIAM HENRY McDOWELL.

Witnesses to the signature of James Leigh:
CHAS. F. SLEEPER,
JOHN R. SNOW.

Witnesses to the signature of Robert William Henry McDowell:
G. E. BUCKNILL,
MARK WM. WOODWARD.